United States Patent [19]

Vaccari

[11] Patent Number: 5,015,520

[45] Date of Patent: May 14, 1991

[54] DOUBLE-LAYER, THIN SHEET PLASTIC MATERIAL FOR PRODUCING DECORATIVE RIBBONS, PACKINGS AND THE LIKE

[75] Inventor: Enzo Vaccari, Ferrara, Italy

[73] Assignee: Star Pennsylvania New Flower S.p.A., Ferrara, Italy

[21] Appl. No.: 390,124

[22] Filed: Aug. 8, 1989

[30] Foreign Application Priority Data

Feb. 8, 1989 [IT] Italy .............................. 35564/89[U]

[51] Int. Cl.$^5$ .......................... B32B 5/32; B32B 7/02; B32B 7/04
[52] U.S. Cl. .................................... 428/215; 428/290; 428/315.5; 428/315.7; 428/317.1
[58] Field of Search ................. 428/215, 315.5, 315.7, 428/315.9, 317.1, 290

[56] References Cited

U.S. PATENT DOCUMENTS

| | | | |
|---|---|---|---|
| 4,039,709 | 8/1977 | Newman | 428/317.1 |
| 4,432,580 | 2/1984 | Lohman et al. | 428/314.4 |
| 4,822,663 | 4/1989 | Reott | 428/317.1 |

FOREIGN PATENT DOCUMENTS 2392170 12/1978 France .............................. 428/316.6

*Primary Examiner*—William J. Van Balen
*Attorney, Agent, or Firm*—Pollock, Vande Sande & Priddy

[57] ABSTRACT

A double-layer, thin sheet-plastic material for the production of decorative tapes or ribbons of packings and the like. The material consists of a first layer of foamed polypropylene coupled to a second layer of a non-woven fabric made up of polypropylene, polyethylene, polyester or the like, the second layer giving the entire material the aspect of a fabric. The layers are coupled by means of an adhesive or by heat or ultrasonic welding.

6 Claims, No Drawings

DOUBLE-LAYER, THIN SHEET PLASTIC MATERIAL FOR PRODUCING DECORATIVE RIBBONS, PACKINGS AND THE LIKE

DESCRIPTION OF PREFERRED EMBODIMENT

The material of the present invention consists of a first layer which is made up for instance of foamed polypropylene and is coupled to a second layer which is made up of a non-woven fabric, for example a layer of polypropylene, polyethylene, a polyester or the like, and which is suitable for giving the entire material the aspect of a fabric.

The two layers are coupled through any suitable means, e.g., by gluing them together by an adhesive or by joining them through heat or ultrasonic welding.

The base layer of foamed polypropylene is of very limited thickness, i.e. between 50 and 150 $\mu$m or even thicker, according to the use for which the sheet material in question is intended; a thickness of about 100 $\mu$m has been shown suitable in the case illustrated in FIG. 2.

As to the non-woven fabric layer, a substance of 20–30 g/m$^2$ was shown to be suitable.

The values mentioned above are merely illustrative and preferable but not limitative, as such values allow the resulting sheet material to acquire physical characteristics similar to those of a standard fabric.

What is claimed is:

1. A double layer, thin sheet plastic material for production of decorative tapes or ribbons, or packages, said material consisting of a first layer of foamed polypropylene attached to a second layer of a non-woven fabric which is adapted to give the material the aspect of a fabric, wherein said first layer has a thickness of 50 to 150$\mu$ and said second layer has a weight of 20 to 30 g/m$^2$.

2. A sheet plastic material according to claim 1, wherein said layer of non-woven fabric is a layer of a material selected from the group consisting of polypropylene, polyethylene and polyester.

3. A sheet plastic material according to claim 1, wherein said layers are attached by means of an adhesive.

4. A sheet plastic material according to claim 1, wherein said layers are attached by heat welding.

5. A sheet plastic material according to claim 1, wherein said layers are attached by ultrasonic welding.

6. A sheet plastic material according to claim 1, wherein said first layer has a thickness of about 100$\mu$.

* * * * *